United States Patent [19]
Bharat et al.

[11] Patent Number: 6,112,203
[45] Date of Patent: Aug. 29, 2000

[54] METHOD FOR RANKING DOCUMENTS IN A HYPERLINKED ENVIRONMENT USING CONNECTIVITY AND SELECTIVE CONTENT ANALYSIS

[75] Inventors: Krishna Asur Bharat, Santa Clara; Monika R. Henzinger, Menlo Park, both of Calif.

[73] Assignee: AltaVista Company, Palo Alto, Calif.

[21] Appl. No.: 09/058,577

[22] Filed: Apr. 9, 1998

[51] Int. Cl.[7] .................................................. G06F 17/21
[52] U.S. Cl. ............................ 707/5; 707/3; 707/513; 707/514; 707/102
[58] Field of Search ............................... 707/3, 5, 7, 531, 707/102, 513, 2, 6, 514, 100

[56] References Cited

U.S. PATENT DOCUMENTS

| | | | |
|---|---|---|---|
| 5,442,784 | 8/1995 | Powers et al. | 707/102 |
| 5,694,594 | 12/1997 | Chang | 707/6 |
| 5,848,407 | 12/1998 | Ishikawa et al. | 707/2 |
| 5,873,081 | 2/1999 | Harel | 707/3 |
| 5,937,422 | 8/1999 | Nelson et al. | 707/531 |
| 5,940,821 | 8/1999 | Wical | 707/3 |
| 5,941,944 | 8/1999 | Messerly | 709/203 |
| 5,953,718 | 9/1999 | Wical | 707/5 |
| 5,963,940 | 10/1999 | Liddy et al. | 707/5 |
| 5,991,756 | 11/1999 | Wu | 707/3 |
| 6,047,126 | 4/2000 | Imai | 395/710 |

OTHER PUBLICATIONS

Kleinberg, "Authoritative Sources in a Hyperlinked Environment," Proc. of ACM–SIAM Symposium on Discrete Algorithms, 1998 (to appear). Also appears as IBM Research Report RJ 10076, May 1997.
Frakes et al., "Information Retrieval, Data Structures and Alrithms," Prentic Hall, Englewood Cliffs, New Jersey 07632.

*Primary Examiner*—Jean R. Homere
*Attorney, Agent, or Firm*—Skjerven Morrill MacPherson LLP; Stephen A. Terrile

[57] ABSTRACT

In a computerized method, a set of documents is ranked according to their content and their connectivity by using topic distillation. The documents include links that connect the documents to each other, either directly, or indirectly. A graph is constructed in a memory of a computer system. In the graph, nodes represent the documents, and directed edges represent the links. Based on the number of links connecting the various nodes, a subset of documents is selected to form a topic. A second subset of the documents is chosen based on the number of directed edges connecting the nodes. Nodes in the second subset are compared with the topic to determine similarity to the topic, and a relevance weight is correspondingly assigned to each node. Nodes in the second subset having a relevance weight less than a predetermined threshold are pruned from the graph. The documents represented by the remaining nodes in the graph are ranked by connectivity based ranking scheme.

9 Claims, 3 Drawing Sheets

METHOD FOR RANKING DOCUMENTS IN A HYPERLINKED ENVIRONMENT USING CONNECTIVITY AND SELECTIVE CONTENT ANALYSIS

FIELD OF THE INVENTION

This invention relates generally to computerized information retrieval, and more particularly to ranking retrieved documents based on the content and the connectivity of the documents.

BACKGROUND OF THE INVENTION

It has become common for users of host computers connected to the World Wide Web (the "Web") to employ Web browsers and search engines to locate Web pages having specific content of interest to users. A search engine, such as Digital Equipment Corporation's AltaVista search engine, indexes hundreds of millions of Web pages maintained by computers all over the world. The users of the hosts compose queries, and the search engine identifies pages that match the queries, e.g., pages that include key words of the queries. These pages are known as a result set.

In many cases, particularly when a query is short or not well defined, the result set can be quite large, for example, thousands of pages. The pages in the result set may or may not satisfy the user's actual information needs. For this reason, most search engines rank order the result set, and only a small number, for example, twenty, of the highest ranking pages are actually returned. Therefore, the quality of search engines can be evaluated not only by the number of pages that are indexed, but also on the usefulness of the ranking process that determines the order in which pages are returned. A good ranking process will return relevant pages before pages that are less relevant.

Sampling of search engine operations has shown that most queries tend to be quite short, on the average about 1.5 words. Therefore, there is usually not enough information in the query itself to rank the pages. Furthermore, there may be pages that are very relevant to the search that do not include any of the key words specified in the query. This makes good ranking difficult.

In Information Retrieval (IR), some ranking approaches have used feedback by the users. This requires the users to supply relevance information for some of the results that were returned by the search to iteratively improve ranking. However, studies have shown that users are generally reluctant to provide relevance feedback. In addition, the database environment of the Web is quite different from the setting of conventional information retrieval systems. The main reasons are: users tend to use very short queries; the collection of pages is changing continuously; and processing all pages in the World Wide Web corpus is practically not feasible.

In one prior art technique, an algorithm for connectivity analysis of a neighborhood graph (n-graph) is described by Kleinberg in "Authoratative Sources in a Hyperlinked Environment," Proc. 9th ACM-SIAM Symposium on Discrete Algorithms, 1998, and also in IBM Research Report RJ 10076, May 1997, see, "http:/www.cs.cornell.edu/Info/People/kleinber/auth.ps." The algorithm analyzes the link structure, or connectivity of Web pages "in the vicinity" of the result set to suggest useful pages in the context of the search that was performed.

The vicinity of a Web page is defined by the hyperlinks that connect the page to others. A Web page can point to other pages, and the page can be pointed to by other pages. Close pages are directly linked, farther pages are indirectly linked. This connectivity can be expressed as a graph where nodes represent the pages, and the directed edges represent the links. The vicinity of all the pages in the result set combined is called the neighborhood graph.

Specifically, the algorithm attempts to identify "hub" and "authority" pages in the neighborhood graph for a user query. Hubs and authorities exhibit a mutually reinforcing relationship; a good hub page is one that points to many good authority pages, and a good authority page is pointed to by many good hubs. Kleinberg's algorithm constructs a graph for a specified base set of hyperlinked pages. Using an iterative algorithm, an authority weight x and a hub weight y is assigned to each page. When the algorithm converges these weights are used to rank the pages as authorities and hubs.

When a page points to many other pages with large x values, the page receives a large y value and is designated as a good hub. When a page is pointed to many pages having large y values, the page receives a large x value and is designated as a good authority.

However, there are some problems with Kleinberg's algorithm which is due to the fact that the analysis is strictly based on connectivity. First, there is a problem of topic drift. For example, if a user composes a query that includes the key words "jaguar" and "car," then the graph will tend to have more pages that mention "car" than "jaguar." These self-reenforcing pages will tend to overwhelm pages mentioning "jaguar" to cause topic drift.

Second, it is possible to have multiple "parallel" edges from pages stored by a single host to the same authority or hub page. This occurs when a single Web site stores multiple copies or versions of pages having essentially the same content. In this case, the single site has undue influence, hence, the authority or hub scores may not be representative.

Third, many Web pages are generated by Web authoring or database conversion tools. Frequently, these tools will automatically insert hyperlinks. For example, the Hypernews system, which turns USENET News articles into Web pages, automatically insert links to the Hypernews Web site.

In U.S. patent application Ser. No. 09/007,635. "Method for Ranking Pages Using Connectivity and Content Analysis" filed by Bharat et al. on Jan. 15, 1998, a method is described with examines both the connectivity and the content of pages to identify useful pages. However, the method is slow because all pages in the neighborhood graph are fetched in order to determine their relevance to the query topic. This is necessary to reduce the effect of non-relevant pages in the subsequent connectivity analysis phase.

Therefore, there is a need to reduce the effect of unrelated pages on the computation in a manner that does not require fetching all pages in the neighborhood graph. If a small, carefully selected subset of pages can be identified for topic distillation, then meaningful ranking results can be presented to users in a more timely manner.

SUMMARY OF THE INVENTION

Provided is a computerized method for ranking a set of documents. The documents include links that connect the various documents to each other. According to the invention, a graph is constructed in a memory of a computer system. The graph includes nodes and directed edges. Each node represents one of the documents, and the directed edges represent the links connecting the documents.

In one aspect of the invention, the documents are Web pages connected to each other by hyperlinks. The identities of the documents, and the hyperlinks are in the form of a string called a Uniform Resource Locator (URL). The URLs specify the addresses of the various documents. The set of documents can be produced by combining the set of results from a Web search engine in response to a user query (which we call the 'start-set'), with pages that either link to or are linked from the start-set documents. Terms of the query imply a topic of interest on which the user requested the search to be made.

The nodes in the start set are first scored according to their connectivity, and the number of terms of the query that appear as unique sub-strings in the URL of the represented documents. The score is a weighted sum of the number of directed edges to and from a node and the number of unique sub-strings of the URL that match a query term.

A subset of documents, for example thirty, represented by the highest scoring nodes in the start-set are selected to form an expanded query topic. The topic is formed by concatenating the first, for example, one thousand words from each of the selected documents.

During a content analysis phase, a relevance weight is assigned to a carefully chosen subset of the nodes in the graph (for example hundred). The relevance weights are based on the similarity of each represented document to the distilled topic as determined above. The relevance weight of a document is further increased when the document includes words that are terms of the query. The graph is pruned to eliminate nodes whose relevance weights are less than a predetermined threshold.

During a connectivity analysis phase, the remaining nodes of the pruned graph are then scored according to their connectivity to determine normalized hub and authority scores for the documents. The normalized scores are used to rank the documents.

In an alternative embodiment, the content and connectivity analysis phases are performed in an iterative process. In each step of the iteration a small number of top-ranked documents, for example, five, are used for content analysis and those with relevance weights below a threshold are pruned. Then the connectivity analysis based ranking is done as described above. This is repeated until either a desired number of documents have been ranked or an allocated quota of documents (for example hundred) has been analyzed.

DETAILED DESCRIPTION OF THE PREFERRED EMBODIMENTS

System Overview

Figure 1:
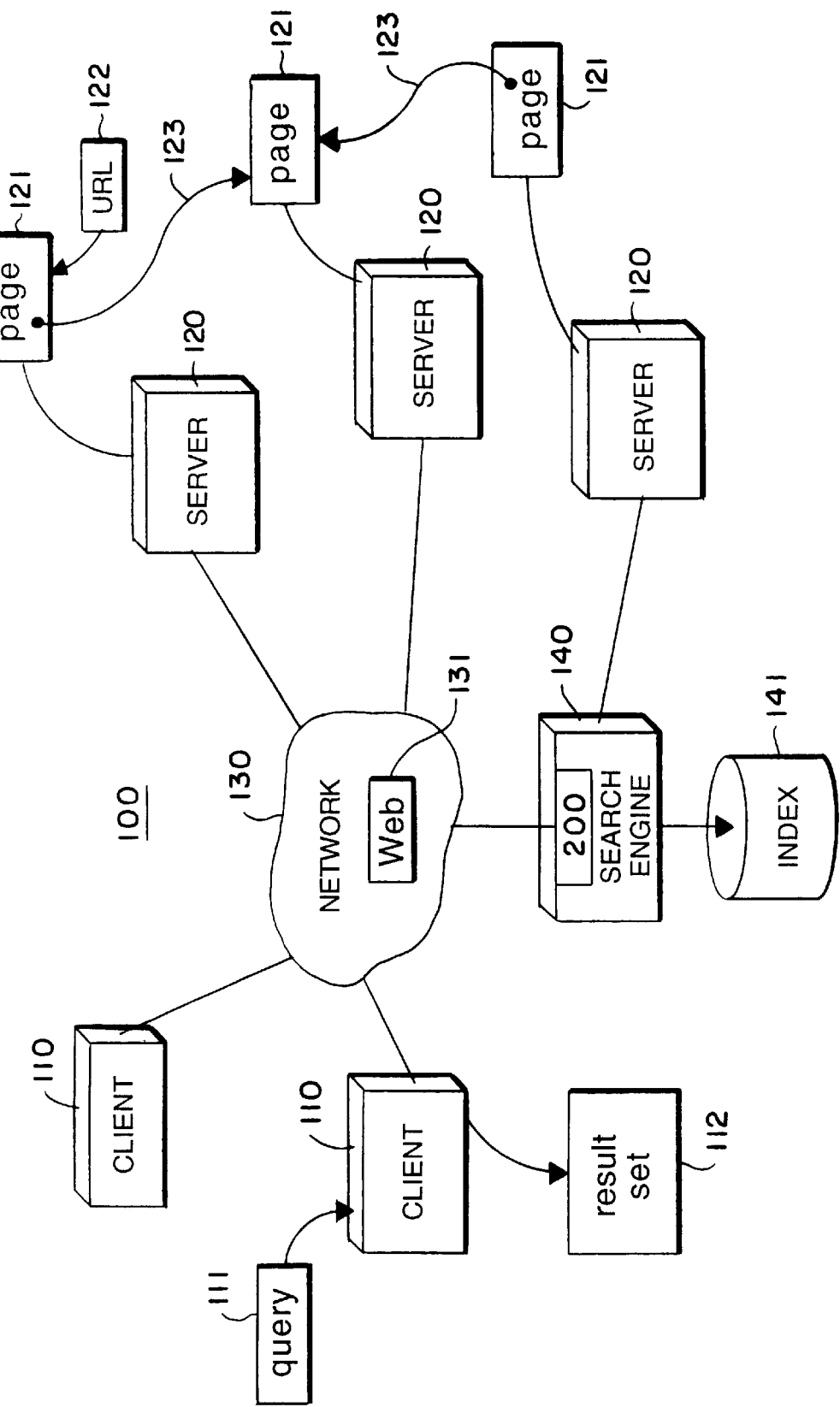
FIG. 1 is a block diagram of a hyperlinked environment that uses the invention.

FIG. 1 shows a distributed network of computers 100 that can use our invention. Client computers 110 and server computers 120 (hosts) are connected to each other by a network 130, for example, the Internet. The network 130 includes an application level interface called the World Wide Web (the "Web").

The Web allows the clients 110 to access documents, for example, multi-media Web pages 121 maintained by the server 120. The location of each page 121 is indicated by an associated Universal Resource Locator (URL) 122. Many of the pages include "hyperlinks" 123 to other pages. The hyperlinks are also in the form of URLs.

Although the invention is described with respect to documents that are Web pages, it should be understood that the invention can also be worked with any linked data objects of a database whose content and connectivity can be characterized.

In order to help users locate Web pages of interest, a search engine 140 maintains an index 141 of Web pages in a memory, for example, disk storage. In response to a query 111 composed by a user, the search engine 140 returns a result set 112 which satisfies the terms (key words) of the query 111. Because the search engine 140 stores many millions of pages, the result set 112, particularly when the query 111 is loosely specified, can include a large number of qualifying pages. These pages may, or may not satisfy the user's actual information need. Therefore, the order in which the result 112 set is presented to the client 110 is indicative of the usefulness of the search engine 140. A good ranking process will return "useful" pages before pages that are less so.

We provide an improved ranking method 200 that can be implemented as part of the search engine 140. Alternatively, the method 200 can be implemented by one of the clients 110, or some other computer system on the path between the search engine and the clients. Our method uses content analysis, as well as connectivity analysis, to improve the ranking of pages in the result set 112.

As an overview, our method includes the following general steps. We intercept the result set 112 generated by the search engine 140. This set of documents forms the start set 201. We begin by constructing a graph in a memory. The nodes in the graph include the pages of the start-set as well as other closely linked pages, as described below. The edges denote the hyperlinks 123 between pages represented in the graph. From the start set, a subset of pages is selected to determine an expanded query "topic." Next, we "prune" the graph so that only pages that specifically relate to the topic implied by the query are represented in the graph. Finally, the connectivity of the pruned graph is scored to determine the ranking of the pages in the result set. Only pages whose content and connectivity ranking exceeds a predetermined threshold are returned to the user.

Constructing Nodes and Edges of an N-graph

Figure 2:
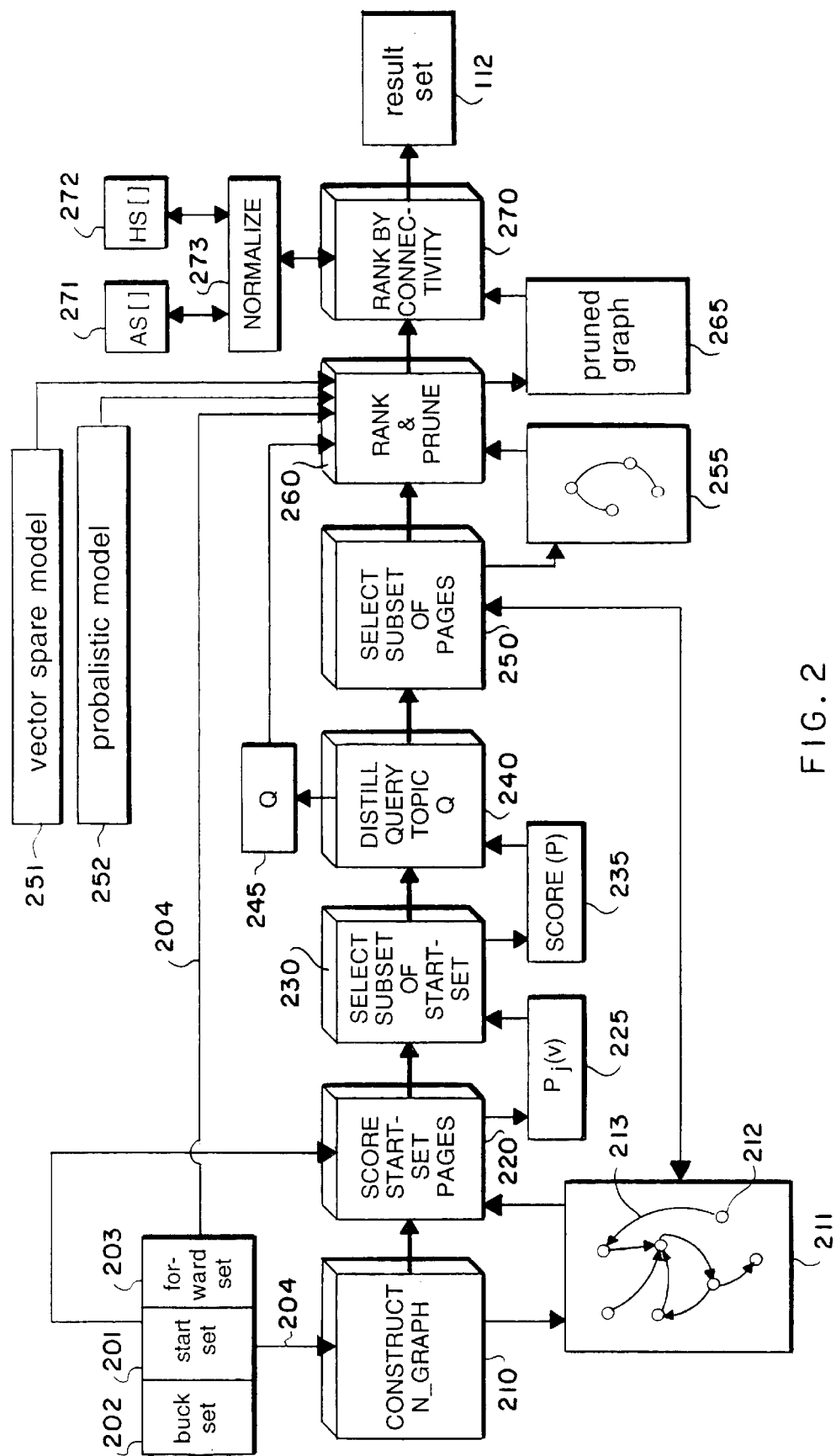
FIG. 2 is a flow diagram of a process for distilling a query topic according to a preferred embodiment of the invention.

FIG. 2 illustrates the details of our computer implemented ranking method 200. An input set of pages 204 for our method is built by beginning with a start set of pages 201. As stated above, the input set 204 can be any type of linked data object, text, video, audio, or just binary data.

The start set 201 is typically derived from a response to a search engine query, for example, the query "+jaguar +car" (locate all pages including the term "jaguar" and the term "car"). In step 210, we use the start set 201 to build a neighborhood graph 211 of nodes 212 and directed edges 213, also known as an "n-graph." In the n-graph 211, each node 212 represents a page 121, and each directed edge 213 represents a hyperlink 123 from one page to another. We construct the nodes 212 of the n-graph 211 first, and add the edges 213 later.

We locate pages that point to at least one of the pages in the start set 201. We call this set of pages the back set 202. With the AltaVista search engine, "link:URL" queries can be used to identify back set pages for each start set page. We add one node 212 to the n-graph 211 for each page of the back set 202. Similarly, the pages pointed to by the start set 201 are located. This can be done by fetching each start set page and extracting the hyperlinks in each of the pages. The pages pointed to by the hyperlinks constitute the forward set 203. Nodes for the forward set of pages are also added to the n-graph 211. Thus, the input set of pages 204 includes the back, start, and forward sets 201–203.

The input set 204 includes pages which do not directly satisfy the query, i.e., pages that do not include key words exactly as specified in the query. However, these pages may be useful because they are linked to pages of the start set. A larger n-graph 211 can be constructed by repeating this process for the back and forward sets 202–203 to add more indirectly linked pages. At this stage, the n-graph 211 has nodes 212 but no edges.

After we have constructed the nodes 212, we add the directed edges 213. If a link points to a page that is represented by a node in the graph, and both pages are on different servers, then a corresponding edge 213 is added to the graph 211. Nodes representing pages on the same server are not linked. This prevents a single Web site with many self-referencing pages to unduly influence the outcome. This completes the n-graph 211.

Next, we assign a relevance weight to a subset of the nodes 212. The relevance weight measures the similarity between the represented page and the query topic. As stated above, the topic implied by the user is probably broader than the query itself. Thus, matching the words of the query with the page is usually not sufficient. Instead, as described in detail below, we use a subset of the pages of the start set 201 to define a broader query topic "Q", and match the pages "P" represented in the graph with the broader query topic to determine the relevance weights of the nodes 212.

Our invention is motivated by the observation that not all pages represented by nodes in the n-graph 211 are equally influential in deciding the outcome of our ranking process. Therefore, our invention selectively performs content analysis, and prunes the graph 211 as needed, so that only nodes that represent the most influential pages are considered in the outcome.

Defining the Query Topic

In our previous approach, all pages of the start set 201 were used to define the query topic Q. This required the fetching of hundreds if not thousands of pages. Downloading a couple of thousand pages over the Web for content analysis takes about thirty minutes. Our present invention which only analyzes a part of the graph 211 reduces this time by at least one order of magnitude, to around three minutes.

Selecting a Subset of Pages to Distill a Query Topic

In our present invention, we use only a subset of the pages for the purpose of content analysis. The subset of influential pages are selected by a heuristic that is based on the URLs of the pages in the start set 201 and their connectivity. This information can be determine from the graph 211 without having to fetch the pages themselves. The heuristic selects nodes based on "in-degree," i.e., the number of edges 213 pointing at a node, "out-degree" (out-going edges) and comparison of the key words in the query with unique sub-strings of the URL.

Specifically, in step 220, we score each page p of the input set 201 to determine a value Score(p) 225. Let $n_p$ be the node representing page p. The score is determined by:

Score(p)=in_degree+2×(num_query_matches)+out_degree, where in_degree is the number of edges pointing at node $n_p$, num_query_matches is the number of unique sub-strings of the URL of the page p that exactly match a term in the user's query, and out-degree is 1 if the node $n_p$ has at least one edge pointing to another page; otherwise, the value of out-degree is 0. Note, the values Score(p) 225 can be determined without having to fetch the actual pages.

In step 230, a small subset of start set pages 235 with the highest values $n_p$ are selected. We select thirty, although it should be understood, that other sized subsets can also be used.

The subset of pages 235 is used to distill the broader query topic Q 245 in step 240. Each page of the subset 235 is fetched, and the first, for example, one-thousand words of all of the selected pages are concatenated to form Q. During this step, "stop" words can be eliminated, and suffixes can be stripped from words using, for example, a stemming operation as described by Porter in "An Algorithm for Suffix Stripping," Program, 14, pp. 130–137, 1980. The query topic Q 245 can be used to determine the relevancy weights of the pages by measuring the similarity of a page to the distilled topic Q, i.e., similarity(Q, P), described in greater detail below.

Pruning the Graph

There are many ways that the graph 211 can be pruned taking into consideration the connectivity of the nodes and their similarity scores.

Threshold Based Pruning

A simple approach, as previously disclosed, uses the relevance weights of all of the nodes to decide whether or not to eliminate a page for user consideration. For example, prune all nodes whose relevance weight is below a predetermined threshold. The threshold can be picked in a number of ways, for example, a fixed fraction (one tenth) of the largest relevance weight, the highest quartile (top 25%), etc. However, this simple approach may still take a considerable amount of time in cases where the graph represents a couple of thousand of pages, because every page needs to be scored against the query topic Q.

Degree Based Pruning

In a better approach, we select only a small number of nodes to form the sub-set of nodes 255 in step 250, and only match pages represented in the selected sub-set with the query topic Q, step 260. Those with relevance weights below a threshold are removed from the graph. All other nodes and nodes not in the selected sub-set remain in the graph.

In our degree based pruning step 250, the in-degree and out-degree of the nodes are used to select a sub-set of nodes to be tested for relevance. Specifically, we define the degree Degree(p) of a page p as:

$$Degree(p)=4\times in\_degree+out\_degree.$$

The top, for example, one-hundred pages by this measure are fetched, and matched against the expanded query Q 245. If the score falls below a predetermined threshold, then the node is pruned.

Content Analysis

In step 260, we assign a similarity weight to each node 213 of the sub-graph 255. Various document similarity measuring techniques have been developed in Information Retrieval to determine the goodness of fit between a "target" document and a collection of documents. These techniques typically measure a similarity score based on word frequencies in the collection and a target document.

There are two popular approaches in Information Retrieval, the "Vector Space Model" 251, and the "Probabilistic Model" 252. With the vector space model, the pages in the collection 204 represented by the sub-graph 255 and the target document 245 can all be regarded as vectors in an n-dimensional vector space, where n corresponds to the number of unique terms in the data set.

A vector matching operation based on the cosine of the angle between the vectors is used to compute document similarity, see for example, Salton et al., "Term-Weighting Approaches in Automatic Text Retrieval,", Information Processing and Management, 24(5), 513–23, 1988. The probabilistic model is described by Croft et al. in "Using Probabilistic Models of Document Retrieval without Relevance Feedback," Documentation, 35(4), 285–94, 1979. For a survey of ranking techniques in Information Retrieval see Frakes et al., "Information Retrieval: Data Structures & Algorithms," Chapter 14—'Ranking Algorithms,' Prentice-Hall, N.J., 1992.

Because the query topic Q 245 can include a large number of terms, and because the "vocabulary" of the various pages can vary considerably, we prefer to use term frequency weighting. More specifically, we use cosine normalization in weighting both the query topic Q and the pages P because the deviation in term vector lengths is large, specifically:

$$similarity(Q, P) = \frac{\sum_{i=1}^{t} (w_{iq} \times w_{ij})}{\sqrt{\sum_{i=1}^{t} (w_{iq})^2 \times \sum_{i=1}^{t} (w_{ij})^2}}$$

where $w_{iq}$=freq$_{iq}$×IDF$_i$, $w_{ij}$=freq$_{ij}$×IDF$_i$, freq$_{iq}$ is the frequency of (stemmed) term i in the query topic Q, freq$_{ij}$ is the frequency of term i in page j, and IDF$_i$ is an estimate of the inverse document frequency (IDF) of the term i in the corpus of documents, for example, in our case, a large representative sample of Web pages. For IDF weights, we measured frequency of occurrence of terms in a collection of 400,000 Yahoo! documents, see "http://www.yahoo.com". We boost the weights of terms i that appear in the original user query 111 by a factor K, for example three. Specifically, if term i is a term in the user query 111, then:

$$w_{iq}=freq_{iq} \times IDF_i \times K.$$

Once similarity weights have been assigned for the nodes in the selected set, nodes falling below the threshold can be pruned to produce a pruned graph 265.

Determining Useful Hubs and Authorities

In step 270, we use a modified Kleinberg algorithm on the nodes of the pruned n-graph 265 to determine useful hub and authority pages. For each node of the pruned n-graph 265, we measure two scores: a hub score (HS), which estimates how good a hub the page is, and an authority score (AS), which estimates how good an authority the page is. The intuition behind our method is this: a good hub is one that points to many documents. A good authority is one that is pointed to by many documents. Transitively, an even better hub is one that points to many good authorities, and an even better authority is one that is pointed to by many good hubs.

We maintain two arrays HS[i] 271 and AS[j] 272 to do the recursive hub and authority computations. Here, the indices i and j are indexed by the nodes of our pruned n-graph 265. Initially, all HS and AS entries are set to 1. The entries are normalized (273) after each iteration. When the normalized arrays stabilizes, the process has converged. Usually, ten iterations produce a stable ranking for AS and HS, and certainly 50 iterations will ensure convergence.

During each iteration for all nodes i and j, we determine weighted counts:

AS[i]=ΣHS[q]*Weight1(q, i); with q such that (q, i) is an edge

HS[j]=ΣAS[q]*Weight2(j, q); with q such that (j, q) is an edge.

In Kleinberg's algorithm, the Weight1(a, b) and Weight2(a, b) are always 1. In our method, we use the following weights to prevent pages maintained by a single server from driving up scores in parts of the graph. Weight1(q, i)=1/k, where k is the number of pages with links to a page i that are on the same server as page q. This prevents pages of a single server to unduly drive up authority scores. Similarly, Weight2(j, q)=1/k, where k is the number of pages pointed to by node j that are on the same server as page q. Note that Weight1( ) and Weight2( ) are in the range of the half open interval (0, . . . , 1], and not fixed to 1 as in the prior art.

Upon completion, the arrays AS and HS contain good estimates of the utility of each page as an authority and as a hub on the topic. We use these scores to rank the nodes in the graph. The top nodes based on AS and HS scores constitute the most promising authorities and hubs in the graph respectively. Pages represented by these nodes can be forwarded to the user as a search engine result set 112, i.e., Title, URL, Abstract, and Score.

Our method is distinguishable from previous techniques because we distill the query topic from a subset of pages. Furthermore, during content analysis we consider only a subset of the nodes within the graph for pruning. Also, we give additional weight to terms that appear as sub-strings in the original user query. Our method gives better results in less time.

Iterative Pruning

Figure 3:
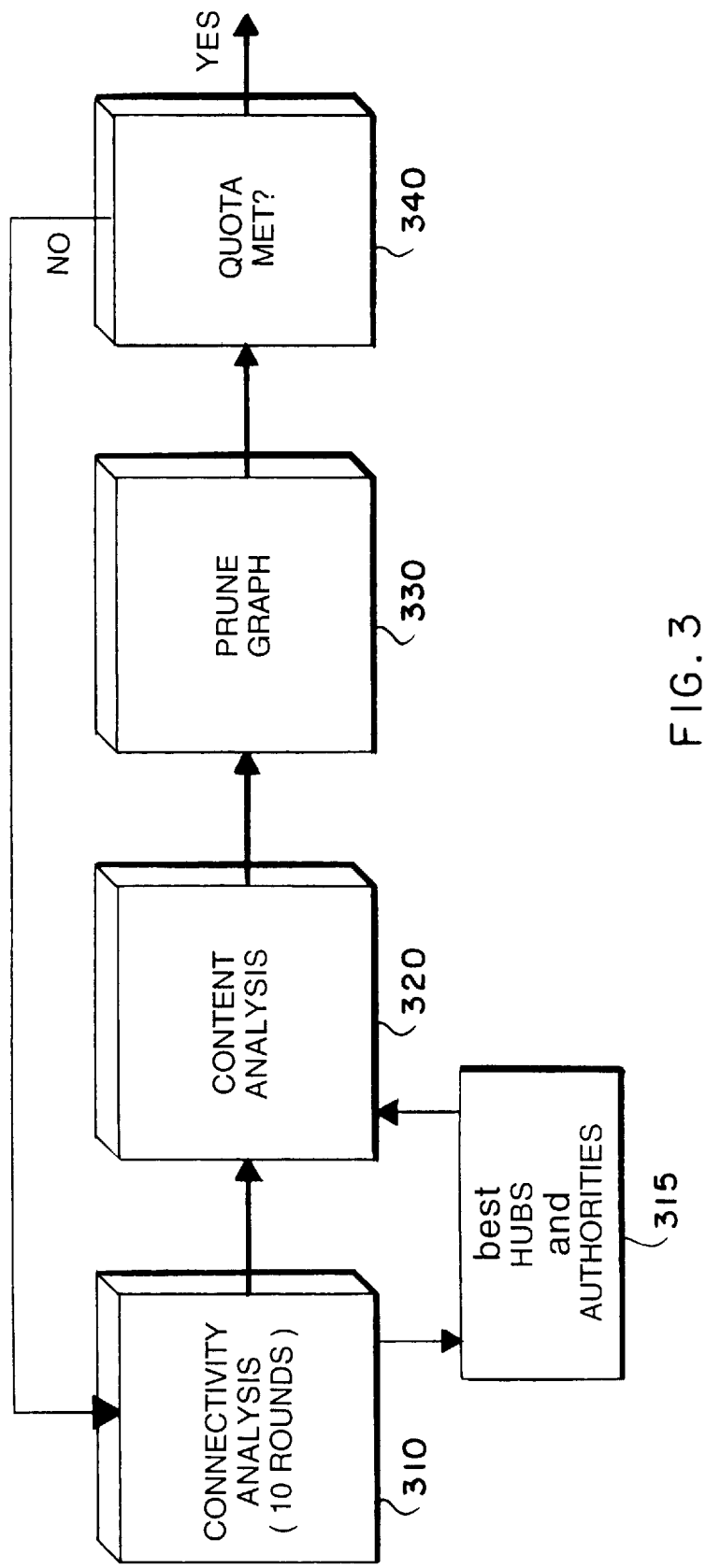
FIG. 3 is a flow diagram of an iterative pruning process of an alternative embodiment of the invention.

In an alternative embodiment as shown in FIG. 3, we use do iterative connectivity analysis 310, content analysis 320, and pruning 330. This method consists of a sequence of rounds. In each round, our modified connectivity analysis is run for 10 iterations to get a listing of the (current) best hubs and authorities 315. In step 320, the pages are examined for content similarity in decreasing order of rank, alternating between the hub and the authority list. Less relevant pages are pruned.

When examining a page, we fetch it and compute its relevance, if not previously processed, until five pages have been fetched, or enough top ranked pages have been found relevant, for example, fifteen. In the latter case, the process terminates, and in the former case the process starts a new round until the quota of pages to be fetched is exhausted (step 340), one hundred in our preferred implementation. The last set of rankings determined for hubs and authorities is returned as the result set 112.

The motivation for stopping each round when a fixed number of pages, e.g., five in our preferred our implementation, have been fetched is that it is usually sufficient if the top ranked pages are pruned, because these pages tend to be represented by high degree nodes that have a high influence on the ranking of other nodes. After this point, it is more profitable to execute another round than to continue with the pruning.

It is understood that the above-described embodiments are simply illustrative of the principles of the invention. Various other modifications and changes may be made by those skilled in the art which will embody the principles of the invention and fall within the spirit and scope thereof as set out in the claims attached.

We claim:

1. A computerized method for ranking a set of documents, the set of documents including links connecting the documents to each other, comprising the step of:

constructing a graph in a memory, the graph including nodes and directed edges, each node representing one of the documents, and the directed edges representing the links connecting the documents;

selecting a first subset of the documents from the set of documents to form a topic;

assigning a relevance weight to each node, the relevance weight of each node based on the similarity of the document represented by the node to the topic;

selecting a second subset of the documents from the set of documents to test for relevance to the topic;

pruning a particular node from the second subset if the associated relevance weight of the particular node is less than a predetermined threshold to form a pruned graph representing a third subset of the documents; and ranking the subset of documents represented by the nodes of the pruned graph according to a connectivity based ranking scheme.

2. The method of claim 1 wherein the set of documents includes pages produced by a search engine in response to a query.

3. The method of claim 2 wherein the set of documents includes pages directly linked to the produced pages.

4. The method of claim 1 wherein each document is identified by a string and the query includes a set of terms, and selecting the first subset of documents according to the number of directed edges connecting a particular node, and the number of terms that appear as unique sub-strings in the string identifying the document represented by the particular node.

5. A computerized method for ranking a set of documents, the set of documents including links connecting the documents to each other, comprising the step of:

constructing a graph in a memory, the graph including the nodes and directed edges, each node representing one of the documents, and the directed edges representing the links connecting the documents, each document being identified by a string and the query includes a set of terms, and selecting the first subset of documents according to the number of directed edges connecting a particular node, and the number of terms that appear as unique sub-strings in the string identifying the document represented by the particular node;

selecting a first subset of the documents from the set of documents to form a topic;

assigning a relevance weight to each node, the relevance weight of each node based on the similarity of the document represented by the node to the topic;

selecting a second subset of the documents from the set of documents to test for relevance to the topic;

pruning a particular node from the second subset if the associated relevance weight of the particular node is less than a predetermined threshold to form a pruned graph representing a third subset of the documents;

ranking the subset of documents represented by the nodes of the pruned graph according to a connectivity based ranking scheme; and, scoring the particular node according to the number of directed edges to the particular node plus two times the number of terms that appears as unique sub-strings plus one if the particular node includes a directed edge to another node.

6. The method of claim 5 including selecting the first subset of documents represented by a predetermined subset of nodes having the highest scores.

7. The method of claim 1 including testing a sub-set of the nodes with a high edge-score for relevance, where the edge-score is based on the number of directed edges connected to a particular node.

8. A computerized method for ranking a set of documents, the set of documents including links connecting the documents to each other, comprising the step of:

constructing a graph in a memory, the graph including the nodes and directed edges, each node representing one of the documents, and the directed edges representing the links connecting the documents;

selecting a first subset of the documents from the set of documents to form a topic;

assigning a relevance weight to each node, the relevance weight of each node based on the similarity of the document represented by the node to the topic;

selecting a second subset of the documents from the set of documents to test for relevance to the topic;

pruning a particular node from the second subset if the associated relevance weight of the particular node is less than a predetermined threshold to form a pruned graph representing a third subset of the documents;

ranking the subset of documents represented by the nodes of the pruned graph according to a connectivity based ranking scheme testing a sub-set of the nodes with a high edge-score for relevance, where the edge-score is based on the number of directed edges connected to a particular node; and setting the edge-score of a particular node to four times the number of directed edges to the particular node plus the number of directed edges to other nodes.

9. The method of claim 1 including iteratively ranking and selecting the most highly ranked nodes for testing and pruning until a predetermined number of documents have been ranked.

* * * * *